(12) United States Patent
Song et al.

(10) Patent No.: US 12,505,332 B2
(45) Date of Patent: Dec. 23, 2025

(54) DEEP LEARNING MODEL BASED ON ATTENTION USING EMBEDDING SCHEME FOR CONTINUOUS VARIABLES OF TABULAR DATA

(71) Applicant: Pusan National University Industry-University Cooperation Foundation, Busan (KR)

(72) Inventors: Giltae Song, Busan (KR); Juseong Kim, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 512 days.

(21) Appl. No.: 17/993,831

(22) Filed: Nov. 23, 2022

(65) Prior Publication Data

US 2023/0206025 A1 Jun. 29, 2023

(30) Foreign Application Priority Data

Dec. 24, 2021 (KR) .................. 10-2021-0187408

(51) Int. Cl.
*G06N 3/04* (2023.01)
*G06N 3/044* (2023.01)
(Continued)

(52) U.S. Cl.
CPC .............. *G06N 3/04* (2013.01); *G06N 3/044* (2023.01); *G06N 3/045* (2023.01); *G06N 3/048* (2023.01);
(Continued)

(58) Field of Classification Search
CPC .......... G06N 3/04; G06N 3/044; G06N 3/045; G06N 3/048; G06N 3/08; G06N 3/082; G06N 3/084; G06N 3/096; G06F 17/16
See application file for complete search history.

(56) References Cited

U.S. PATENT DOCUMENTS

| 8,219,507 B2 * | 7/2012 | Jaros | G06N 20/00 706/12 |
| 11,741,361 B2 * | 8/2023 | Zheng | G06F 18/2414 706/26 |

(Continued)

FOREIGN PATENT DOCUMENTS

KR 10-2018-0069877 A 6/2018

OTHER PUBLICATIONS

Huang et al. "TabTransformer: Tabular Data Modeling Using Contextual Embeddings," arXiv: 2012.06678v1, [cs.LG] 2020.
(Continued)

*Primary Examiner* — Michael J Jansen, II
(74) *Attorney, Agent, or Firm* — MARSHALL, GERSTEIN & BORUN LLP (57) ABSTRACT

A deep learning model based on attention using an embedding scheme for continuous variables of tabular data. A method of constructing the deep learning model based on attention includes converting tabular data of structured data having a mixture of categorical variables and continuous variables into embedding values and training a network model including a transformer block, a linear layer block, and a sharing function for the sharing of an attention between the transformer block and the linear layer block by using the embedding values.

16 Claims, 10 Drawing Sheets

(51) Int. Cl.
  *G06N 3/045* (2023.01)
  *G06N 3/048* (2023.01)
  *G06N 3/08* (2023.01)
  *G06N 3/082* (2023.01)
  *G06N 3/084* (2023.01)

(52) U.S. Cl.
  CPC .............. *G06N 3/08* (2013.01); *G06N 3/082* (2013.01); *G06N 3/084* (2013.01)

(56) References Cited

U.S. PATENT DOCUMENTS

| | | | | |
|---|---|---|---|---|
| 11,755,883 | B2* | 9/2023 | Dai | G06V 10/454 |
| | | | | 706/27 |
| 12,014,265 | B2* | 6/2024 | Nurvitadhi | G06T 1/20 |
| 2009/0006289 | A1* | 1/2009 | Jaros | G06N 3/049 |
| | | | | 706/12 |
| 2018/0268296 | A1* | 9/2018 | Zheng | G06N 3/044 |
| 2022/0383069 | A1* | 12/2022 | Dai | G06N 3/044 |
| 2023/0103635 | A1* | 4/2023 | Xu | G16H 70/40 |
| | | | | 702/19 |
| 2023/0206025 | A1* | 6/2023 | Song | G06N 3/08 |
| | | | | 706/12 |
| 2023/0316058 | A1* | 10/2023 | Nurvitadhi | G06N 3/04 |
| | | | | 706/15 |
| 2025/0036953 | A1* | 1/2025 | Garudadri | G06N 3/082 |

OTHER PUBLICATIONS

Office Action issued in Korean Patent Application No. 10-2021-0187408, dated Dec. 11, 2024.

* cited by examiner

DEEP LEARNING MODEL BASED ON ATTENTION USING EMBEDDING SCHEME FOR CONTINUOUS VARIABLES OF TABULAR DATA

CROSS-REFERENCES TO RELATED APPLICATIONS

This application is based on and claims priority under 35 U.S.C. 119 to Korean Patent Application No. 10-2021-0187408, filed on Dec. 24, 2021, in the Korean intellectual property office, the disclosures of which are herein incorporated by reference in their entireties.

TECHNICAL FIELD

The following description relates to a technology for constructing a deep neutral network (DNN) model based on attention.

BACKGROUND OF THE DISCLOSURE

Data that is collected in various industrial sites or the medical field includes unstructured data, such as images and natural languages, but most of the data includes tabular data.

With the advent of a convolution neural network (CNN), a Recurrent Neural Network (RNN), a Long Short-Term Memory model (LSTM), and a transformer, a deep learning model shows a great accomplishment in unstructured data learning, such as a natural language and an image.

In contrast, the tabular data has very excellent performance in a machine learning algorithm, particularly, in gradient boosting decision trees (GBDT) (e.g., LightGBM or XGBoost). Accordingly, in the tabular data, a machine learning algorithm is chiefly used in an actual site, and a deep learning model is used as the second best plan.

For example, Korean Patent Application Publication No. 10-2018-0069877 (laid on Jun. 25, 2018) discloses a technology for constructing a network model based on machine learning.

However, a machine learning algorithm has the following uppermost limits. Continuous learning is difficult for a trained model because training is performed according to a statistical method and learning data needs to be distributed. Furthermore, the learning of real-time data or data having a very large dimension is difficult, and performance is very low. Finally, there is a difficulty in multi-modality learning because end-to-end (E2E) learning is difficult.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments provide a method and apparatus for constructing a deep learning model having performance higher than that of machine learning in the learning of tabular data consisting of categorical variables and continuous variables, that is, structured data.

Embodiments provide a method and apparatus for constructing a sharing attention between linear block and transformer block (SALT) model, that is, a model based on attention in which an attention matrix is shared between a linear block and a transformer block.

There is provided a method of constructing a deep learning model based on attention, which is performed in a computer device and includes converting, by at least one processor included in the computer device, tabular data of structured data having a mixture of categorical variables and continuous variables into embedding values, and training, by the at least one processor, a network model including a transformer block, a linear layer block, and a sharing function for the sharing of an attention between the transformer block and the linear layer block by using the embedding values.

According to an aspect, converting the tabular data may include converting the categorical variables into the embedding values by using index information of an embedding matrix, and converting the continuous variables into the embedding values through a matrix product of a softmax and an embedding matrix by projecting the continuous variables by a size of the embedding matrix through a linear layer.

According to another aspect, converting the tabular data may include converting, into the embedding values, learning data obtained by adding a token value to the tabular data.

According to still another aspect, each of the transformer block and the linear layer block may include at least two sub-blocks on the basis of a direction in which data is learnt.

According to still another aspect, each of the transformer block and the linear layer block may include a feature-wise sub-block and a dimension-wise sub-block.

According to still another aspect, the transformer block may include a self-attention layer, a feed-forward layer, a residual connection of each layer, and layer normalization.

According to still another aspect, a gating unit of the linear layer block may have a multi-head structure based on a multi-layer perceptron (MLP) model structure.

According to still another aspect, training the network model may include converting an attention matrix in an identical direction between the transformer block and the linear layer block into a sharing attention matrix of one matrix through the sharing function, and transmitting the sharing attention matrix to a next stack.

According to still another aspect, training the network model may include returning a result value of the transformer block, a result value of the linear layer block, an attention matrix calculated in a feature-wise sub-block and dimension-wise sub-block of the transformer block, and an attention matrix calculated in a feature-wise sub-block and dimension-wise sub-block of the linear layer block, converting, into a feature-wise sharing attention matrix of one matrix, the attention matrices calculated in the feature-wise sub-blocks of the transformer block and the linear layer block through the sharing function and converting, into a dimension-wise sharing attention matrix of one matrix, the attention matrices calculated in the dimension-wise sub-blocks of the transformer block and the linear layer block, and transmitting the feature-wise sharing attention matrix and the dimension-wise sharing attention matrix to the next stack. The feature-wise sharing attention matrix and the dimension-wise sharing attention matrix that are received from a previous stack may be added to attention matrices that are operated in self-attention layers of the transformer block and the linear layer block.

According to still another aspect, the method may further include performing, by the at least one processor, at least one of fine tuning and pre-training on the tabular data by using a contextual embedding value that is obtained through the network model.

There is provided a system for constructing a deep learning model based on attention, which is implemented as a computer and includes at least one processor configured to execute computer-readable instructions included in a memory. The at least one processor is configured to convert tabular data of structured data having a mixture of categorical variables and continuous variables into embedding values, and train a network model including a transformer block, a linear layer block, and a sharing function for the sharing of an attention between the transformer block and the linear layer block by using the embedding values.

There is provided a computer program which is stored in a computer-readable recording medium in order to execute a method of constructing a deep learning model based on attention in a computer. The method includes converting tabular data of structured data having a mixture of categorical variables and continuous variables into embedding values, and training a network model including a transformer block, a linear layer block, and a sharing function for the sharing of an attention between the transformer block and the linear layer block by using the embedding values.

According to embodiments of the present disclosure, uppermost limits of a machine learning algorithm can be overcome and performance higher than that of machine learning in tabular data can be implemented because the deep learning model based on attention, including the embedding layer that embeds continuous variables of the tabular data in addition to categorical variables of the tabular data, the transformer block having the attention module, and the linear block, is constructed.

According to embodiments of the present disclosure, the transformer block, that is, a basis for many models, can be used through the embedding of continuous variables. Accordingly, a contextual embedding value can be obtained, and information which may be interpreted through an attention matrix can be provided.

According to embodiments of the present disclosure, higher performance can be implemented by constructing the deep learning model based on attention in which the attention matrix is shared between the linear block and the transformer block.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, embodiments of the present disclosure are described in detail with reference to the accompanying drawings.

Embodiments of the present disclosure relate to a technology for constructing a deep neutral network (DNN) model based on attention.

In this specification, according to embodiments that include specifically disclosed contents, a deep learning model based on attention using an embedding scheme for continuous variables of tabular data can be constructed.

In this specification, tabular data may mean a basic form and the final storage form in most of data, and may comprehensively mean structured data including at least one of categorical variables and continuous variables. Information on each data, such as an attribute and a form, may be finally stored and managed as tabular data.

Figure 1:
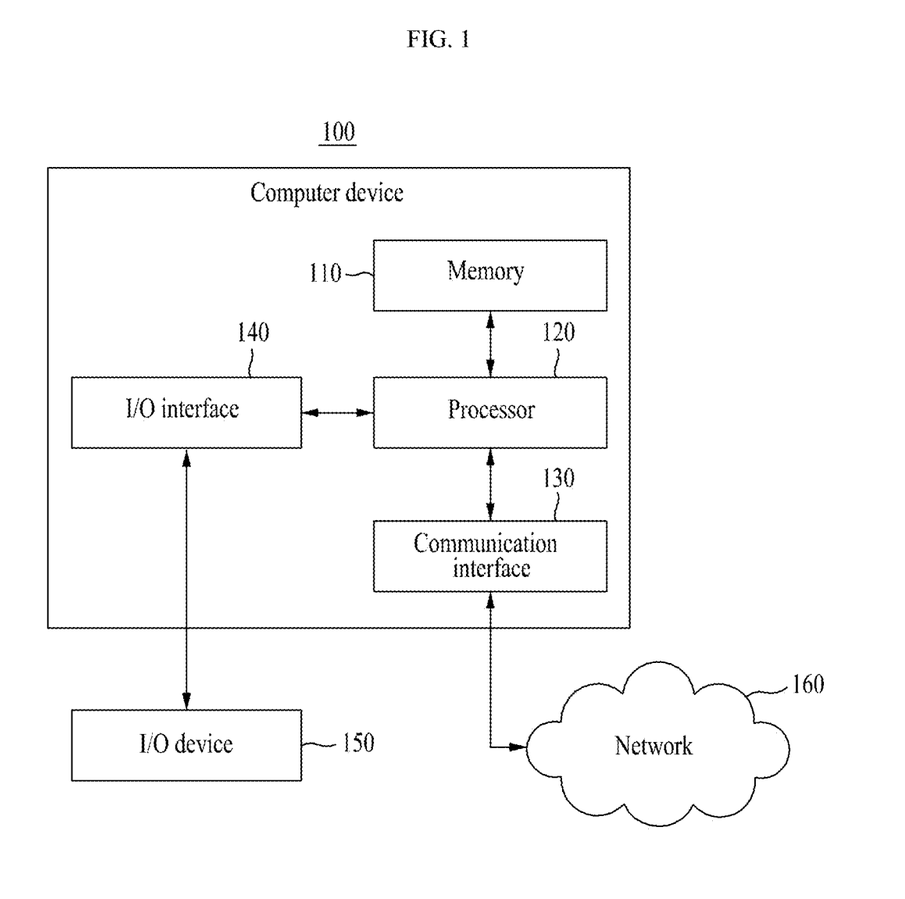
FIG. 1 is a block diagram for describing an example of internal components of a computer device in an embodiment of the present disclosure.

FIG. 1 is a block diagram illustrating an example of a computer device according to an embodiment of the present disclosure. For example, a system for constructing a deep learning model based on attention according to embodiments of the present disclosure may be implemented by a computer device 100 illustrated in FIG. 1.

As illustrated in FIG. 1, the computer device 100 may include memory 110, a processor 120, a communication interface 130, and an input/output (I/O) interface 140, as components for executing a method of constructing a deep learning model based on attention according to embodiments of the present disclosure.

The memory 110 is a computer-readable recording medium, and may include permanent mass storage devices, such as random access memory (RAM), read only memory (ROM), and a disk drive. In this case, the permanent mass storage device, such as ROM and a disk drive, may be included in the computer device 100 as a permanent storage device separated from the memory 110. Furthermore, an operating system and at least one program code may be stored in the memory 110. Such software components may be loaded onto the memory 110 from a computer-readable recording medium separated from the memory 110. Such a separate computer-readable recording medium may include computer-readable recording media, such as a floppy drive, a disk, a tape, a DVD/CD-ROM drive, and a memory card. In another embodiment, software components may be loaded onto the memory 110 through the communication interface 130 not a computer-readable recording medium. For example, the software components may be loaded onto the memory 110 of the computer device 100 based on a computer program installed by files received over a network 160.

The processor 120 may be configured to process instructions of a computer program by performing basic arithmetic, logic and I/O operations. The instructions may be provided to the processor 120 by the memory 110 or the communication interface 130. For example, the processor 120 may be configured to execute received instructions based on a program code stored in a recording device, such as the memory 110.

The communication interface 130 may provide a function for enabling the computer device 100 to communicate with other devices over the network 160. For example, a request, a command, data or a file generated by the processor 120 of the computer device 100 based on a program code stored in a recording device, such as the memory 110, may be provided to other devices over the network 160 under the control of the communication interface 130. Inversely, a signal, a command, data or a file from another device may be received by the computer device 100 through the communication interface 130 of the computer device 100 over the network 160. A signal, a command or a file received through the communication interface 130 may be transmitted to the processor 120 or the memory 110. A file received through the communication interface 130 may be stored in a storage device (e.g., the aforementioned permanent storage device) which may be further included in the computer device 100.

The communication method is not limited, and may include short-distance wireless communication between devices in addition to communication methods using communication networks (e.g., a mobile communication network, wired Internet, wireless Internet, and a broadcasting network) which may be included in the network 160. For example, the network 160 may include one or more given networks of a personal area network (PAN), a local area network (LAN), a campus area network (CAN), a metropolitan area network (MAN), a wide area network (WAN), a broadband network (BBN), and the Internet. Furthermore, the network 160 may include one or more of network topologies, including a bus network, a star network, a ring network, a mesh network, a star-bus network, and a tree or hierarchical network, but is not limited thereto.

The I/O interface 140 may be means for an interface with an I/O device 150. For example, the input device may include a device, such as a microphone, a keyboard, a camera, or a mouse. The output device may include a device, such as a display or a speaker. Furthermore, for example, the I/O interface 140 may be means for an interface with a device in which functions for input and output have been integrated into one, such as a touch screen. The I/O device 150, together with the computer device 100, may be configured as a single device.

Furthermore, in other embodiments, the computer device 100 may include components greater or smaller than the components of FIG. 1. However, it is not necessary to clearly illustrate most of conventional components. For example, the computer device 100 may be implemented to include at least some of the I/O devices 150 or may further include other components, such as a camera, various sensors, and a database.

Figure 2:
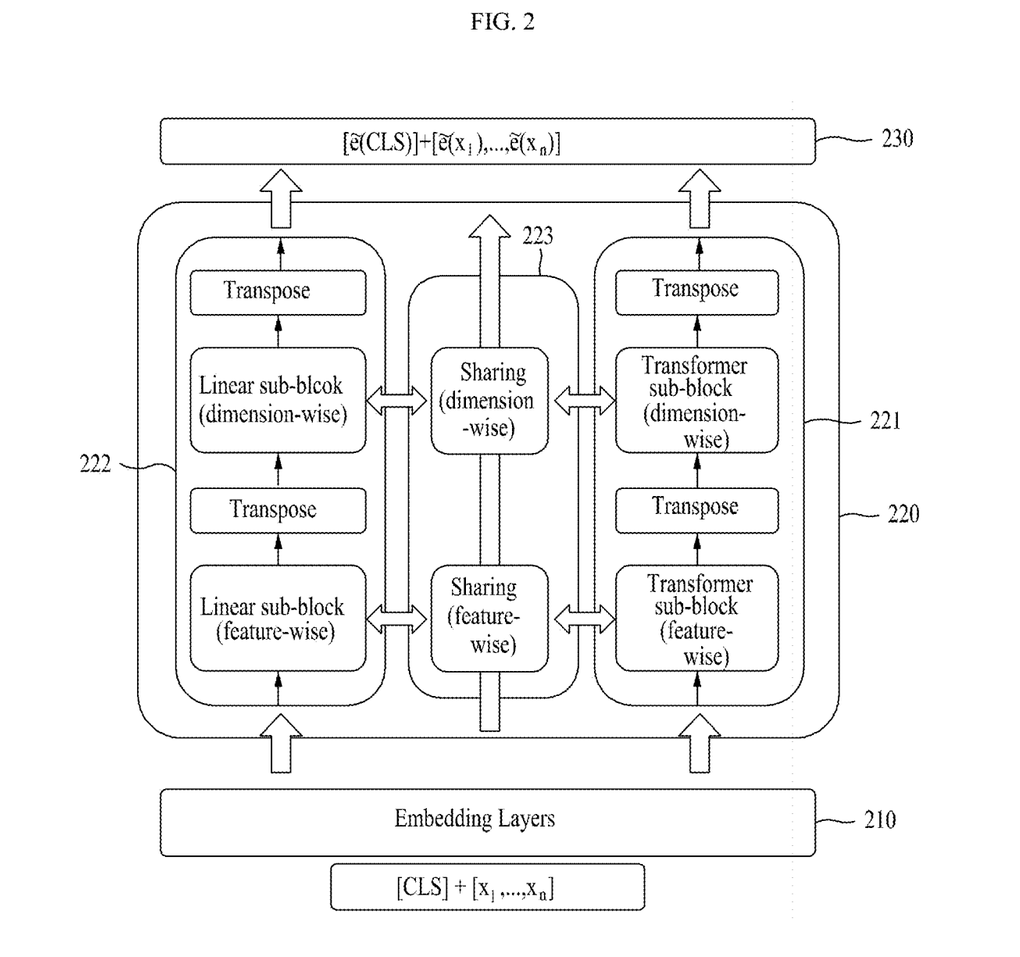
FIG. 2 illustrates a general structure of a sharing attention between linear block and transformer block (SALT) model in an embodiment of the present disclosure.

FIG. 2 illustrates a general structure of a sharing attention between linear block and transformer block (SALT) model in an embodiment of the present disclosure.

Referring to FIG. 2, the SALT model may be basically divided into an embedding layer 210, a learning layer 220, and a prediction layer 230.

First, the embedding layer 210 converts both categorical variables and continuous variables of tabular data into values having an embedding dimension. Accordingly, the variables may be projected onto a massed space, and may be learnt as values having the same space with respect to heterogeneous variables, that is, features of tabular data.

The learning layer 220 includes a transformer block 221, a linear block 222, and a sharing function 223. Each of the transformer block 221 and the linear block 222 includes two sub-blocks on the basis of the direction of data that is learnt. One of the two sub-blocks is a feature-wise sub-block, and the other thereof is a dimension-wise sub-block. Each of the transformer block 221 and the linear block 222 has the two sub-blocks, and returns a result value of each block, a feature-wise attention matrix, and a dimension-wise attention matrix. The sharing function 223 is a function for calculating as one attention matrix, the same-wise attention matrix that is obtained from the two sub-blocks of each of the transformer block 221 and the linear block 222. The calculated one attention matrix becomes a sharing attention matrix, and is transmitted to a block of a next stack. In this case, a value that is calculated by adding result values obtained after all the stacks of the learning layer 220 are calculated is called a contextual embedding value.

The SALT model performs the return and pre-training of the final prediction value through the last prediction layer 230 by using the contextual embedding value.

A learning process of the SALT model according to an embodiment of the present disclosure is as follows.

First, it is assumed that tabular data having m data samples is $D=\{x_i, y_i\}_{i=1}^m$. Data $x_i \in R^n$ of n variables other than a label value includes categorical variables xcat and continuous variables xcon. The SALT model uses [cls, xcat, xcon] as an input $X_i \in R^{(n+1)}$ by adding a special token value [cls] to variable data [xcat, xcon] as learning data. The reason why the token value of [cls] is added is to perform classification and prediction from a value at a [cls] location of the contextual embedding value, which is influenced in a method using a language model Bidirectional encoder representation of transformer (BERT) and obtained from the learning layer 220, and to perform pre-training from a value at another remaining variable location.

The SALT transforms an input $X_i=[\text{cls}, x_0, \ldots, x_i]$ into a value $E(X_i) \in R^{(n+1) \times d}$ having an embedding dimension d through the embedding layer 210 $E(\bullet)$. An embedding value $E(*X_i)=[e[\text{cls}]), e(x_0), \ldots, e(x_i)]$ that is obtained through the embedding layer 210 is used as an input to the learning layer 220 of the SALT.

The learning layer 220 includes L stacks. One stack includes the transformer block 221, the linear block 222, and the sharing function 223. It is assumed that the transformer block 221 is Transformer($\bullet$), the linear block 222 is Linear ($\bullet$), and the sharing function 223 is Sf($\bullet$) and Sd($\bullet$). In this case, Sf($\bullet$) is a feature-wise sharing function, and Sd($\bullet$) is a dimension-wise sharing function. The transformer block Transformer1($\bullet$) and linear block Linear($\bullet$) of the first stack uses, as an input value, an embedding value $E(X_i)$ that is obtained from the embedding layer 210. The transformer block and the linear block return a result value $z \in R^{(n+1) \times d}$, a feature-wise attention matrix $a_f \in R^{h \times (n+1) \times (n+1)}$, and a dimension-wise attention matrix $a_d \in R^{h \times d \times d}$. Both attention matrices af and ad have a form of a multi-head, and the number of heads is h.

The following is an equation for the transformer block and the linear block in the first stack.

$$z_t^{(1)}, a_{f_t}^{(1)}, a_{d_t}^{(1)} = \text{Transformer}_1(E(X_i)) \quad (1)$$

$$z_l^{(1)}, a_{f_l}^{(1)}, a_{d_l}^{(1)} = \text{Linear}_1(E(X_i)) \quad (2)$$

wherein zt and zl are result values of the transformer block and the linear block, respectively. $a_{f_t}$ and $a_{d_t}$ are attention matrices that are calculated in the feature-wise sub-block and dimension-wise sub-block of the transformer block. $a_{f_l}$ and $a_{d_l}$ attention matrices that are calculated in the feature-wise sub-block and dimension-wise sub-block of the linear block.

The attention matrices that are obtained from the transformer block 221 and the linear block 222 need to be transformed into one sharing matrix in order to be shared by blocks of a next stack. The sharing functions 223 Sf(•) and Sd(•) transform the feature-wise attention matrix and the dimension-wise attention matrix into one sharing matrix. The feature-wise sharing function Sf(•) connects the feature-wise attention matrices $a_{f_i}$ and $a_{d_i}$ that are obtained from the transformer block and the linear block in head-wise, reduces the number of heads that has been doubled by multiplying the existing number of heads by a weight Wf, and returns a sharing attention matrix $\tilde{a}_f$. The same is true of a dimension-wise process.

$$\tilde{a}_f = S_f(a_{f_t}, a_{f_l}) = \text{concat}(a_{f_t}, a_{f_l}) W_f \quad (3)$$

$$\tilde{a}_d = S_d(a_{d_t}, a_{d_l}) = \text{concat}(a_{d_t}, a_{d_l}) W_d \quad (4)$$

The sharing attention matrices $\tilde{a}_f$ and $\tilde{a}_d$ that are obtained through the sharing functions of Equations 3 and 4 are transmitted to the transformer block and linear block of a next stack. The same equation is performed from the second stack of the learning layer 220 to the last stack, and is the same as the following equation.

$$z_t^{(i)}, a_{f_t}^{(i)}, a_{d_t}^{(i)} = \text{Transformer}_i(z_t^{(i-1)}, \tilde{a}_f^{(i-1)}, \tilde{a}_d^{(i-1)}) \quad (5)$$

$$z_l^{(i)}, a_{d_l}^{(i)}, a_{d_l}^{(i)} = \text{Linear}_i(z_l^{(i-1)}, \tilde{a}_f^{(i-1)}, \tilde{a}_d^{(i-1)}) \quad (6)$$

$$\tilde{a}_f^{(i)} = S(a_{f_t}^{(i)}, a_{f_l}^{(i)}) \quad (7)$$

$$\tilde{a}_d^{(i)} = S(a_{d_t}^{(i)}, a_{d_l}^{(i)}) \quad (8)$$

Output values $z_t^L$ and $z_l^L$ that obtained through the transformer block and the linear block up to the last L stacks are added and returned as a contextual embedding value $\tilde{E}(X_i) \in R^{(n+1) \times d}$, that is, the final output value of the learning layer 220.

The final prediction value $\hat{y}$=MLP($\tilde{e}$(cls)) is returned by using $\tilde{e}$(cls), that is, a contextual embedding value at the $\tilde{E}(X_i)$=[$\tilde{e}$(cls), $\tilde{e}(x_1)$, ..., $\tilde{e}(x_i)$] location that has been added to the input data in the contextual embedding value obtained from the learning layer 220, as an input value of simple MLP.

Another contextual embedding value [$\tilde{e}(x_1)$, $\tilde{e}(x_2)$, ..., $\tilde{e}(x_{i-1})$, $\tilde{e}(x_i)$] other than $\tilde{e}$(cls) is used for pre-training. The pre-training follows a masked language model (MLM) method of a language model BERT, and is performed so that the contextual embedding value [$\tilde{e}(x_1)$, $\tilde{e}(x_2)$, ..., $\tilde{e}(x_{i-1})$, $e(x_i)$] obtained through the model by using a value that is obtained by replacing some of input values with a mask value becomes equal to the existing value through the simple MLP. For example, the pre-training is performed so that a prediction value of a value of the contextual embedding value [$\tilde{e}(x_1)$, $\tilde{e}$(MASK), ..., $\tilde{e}$(MASK), ..., $\tilde{e}(x_i)$] obtained from the model, which has been obtained through the prediction layer, with respect to input data [$x_0$, [MASK], ..., [MASK], ..., $x_i$] that has been replaced with a mask becomes equal to the existing data value [$x_0$, $x_1$, ..., $x_{i-1}$, $x_i$]. The weight of the model is learnt so that variable information and relation information are obtained through such pre-training.

In the present embodiment, an embedding method for tabular data learning is as follows.

Tabular data, that is, structured data, includes a mixture of continuous variables and categorical variables. There is a difficulty in embedding the continuous variables of the tabular data. The categorical variables of the tabular data have integer values, and may be returned as embedding values by using the categorical variables as the index of an embedding matrix as in a method which is used in a language model. In contrast, it is difficult to use the continuous variables as the index because the continuous variables have real number values.

Figure 3:
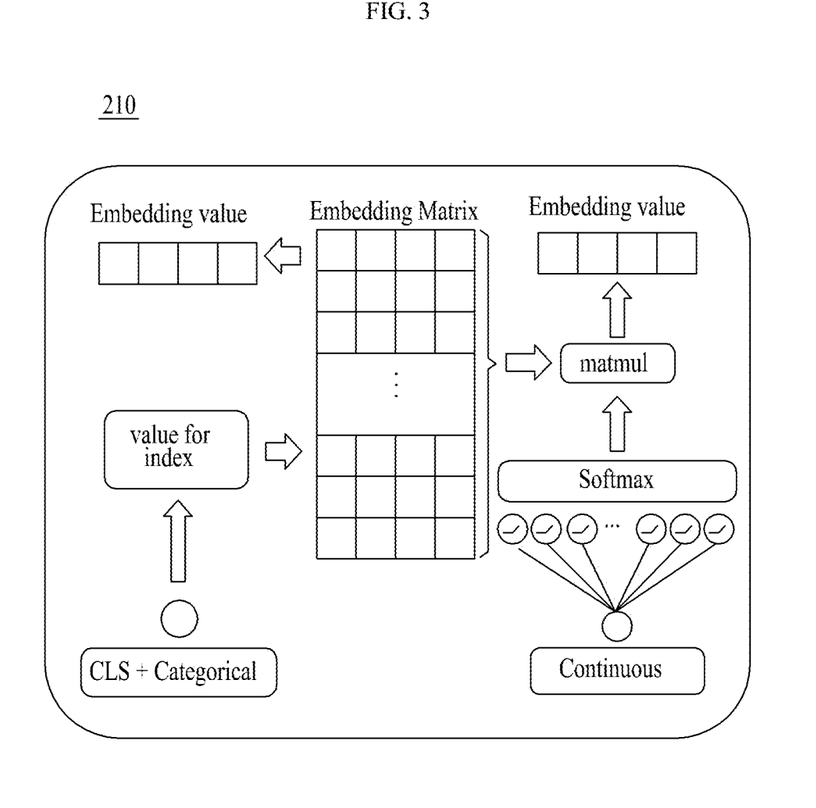
FIG. 3 illustrates the structure of an embedding layer of the SALT model in an embodiment of the present disclosure.

In the present embodiment, in order to overcome the difficulty in the embedding of the continuous variables, the embedding layer 210 having a new structure is applied.

FIG. 3 illustrates the structure of the embedding layer 210 of the SALT model in an embodiment of the present disclosure.

Referring to FIG. 3, the embedding layer 210 includes a structure for embedding both categorical variables and continuous variables. The left of FIG. 3 is an embedding process for the categorical variables. [cls] and categorical variables are integer values. The left of FIG. 3 illustrates a process of converting the integer values into embedding values by using the integer values as the index of an embedding matrix. The right of FIG. 3 is an embedding process for continuous variables, and illustrates a process of converting a dimension into the same size as the embedding matrix through at least one linear layer. Thereafter, the value of each node is normalized into a value 0 to 1 through a softmax function. The value of each node that has experienced the normalization may be used as a probability value for the index of the embedding matrix. An embedding value using the weight of the embedding matrix may be obtained by weighted-summing a node value having the size of the embedding matrix and the embedding matrix through a matrix product. In other words, the continuous variables are converted into embedding values through the matrix product of the softmax and the embedding matrix by projecting the continuous variables by the size of the embedding matrix through the linear layer.

The following is an equation for the embedding method.

$$E(x_{cont_i}) = \text{Softmax}(f_i(x_{cont_i})) \otimes e \quad (9)$$

$$E(x_{cat_i}) = e[x_{cat_i}] \quad (10)$$

Figure 4:
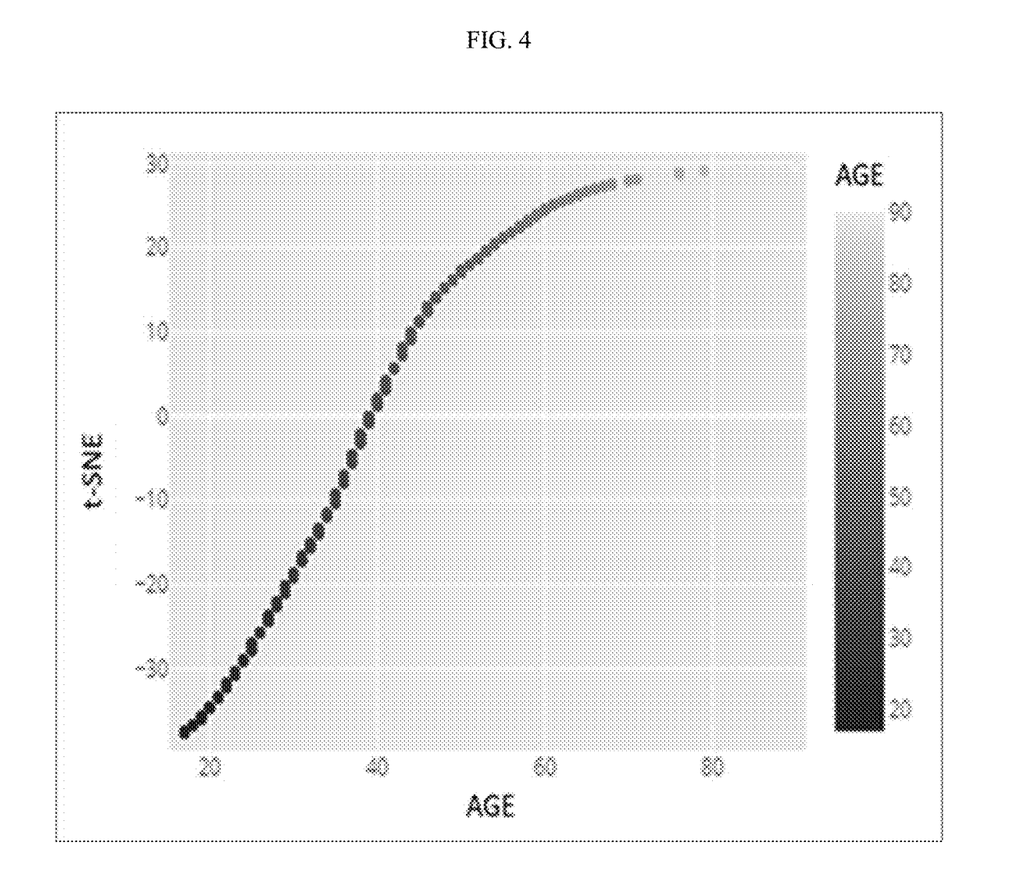
FIG. 4 illustrates a t-SNE graph for the embedding results of age variables, that is, continuous variables, after model training based on benchmark data (income).

FIG. 4 is a t-SNE graph for the embedding results of age variables, that is, continuous variables, after model training based on benchmark data (income).

In other words, FIG. 4 illustrates a t-SNE plot for the embedding results of age variables, that is, one of continuous variables of income data among benchmark data. As illustrated, FIG. 4 illustrates a linear relation between values of the age variables and embedding values, and illustrates that there is an embedding effect.

Figure 5:
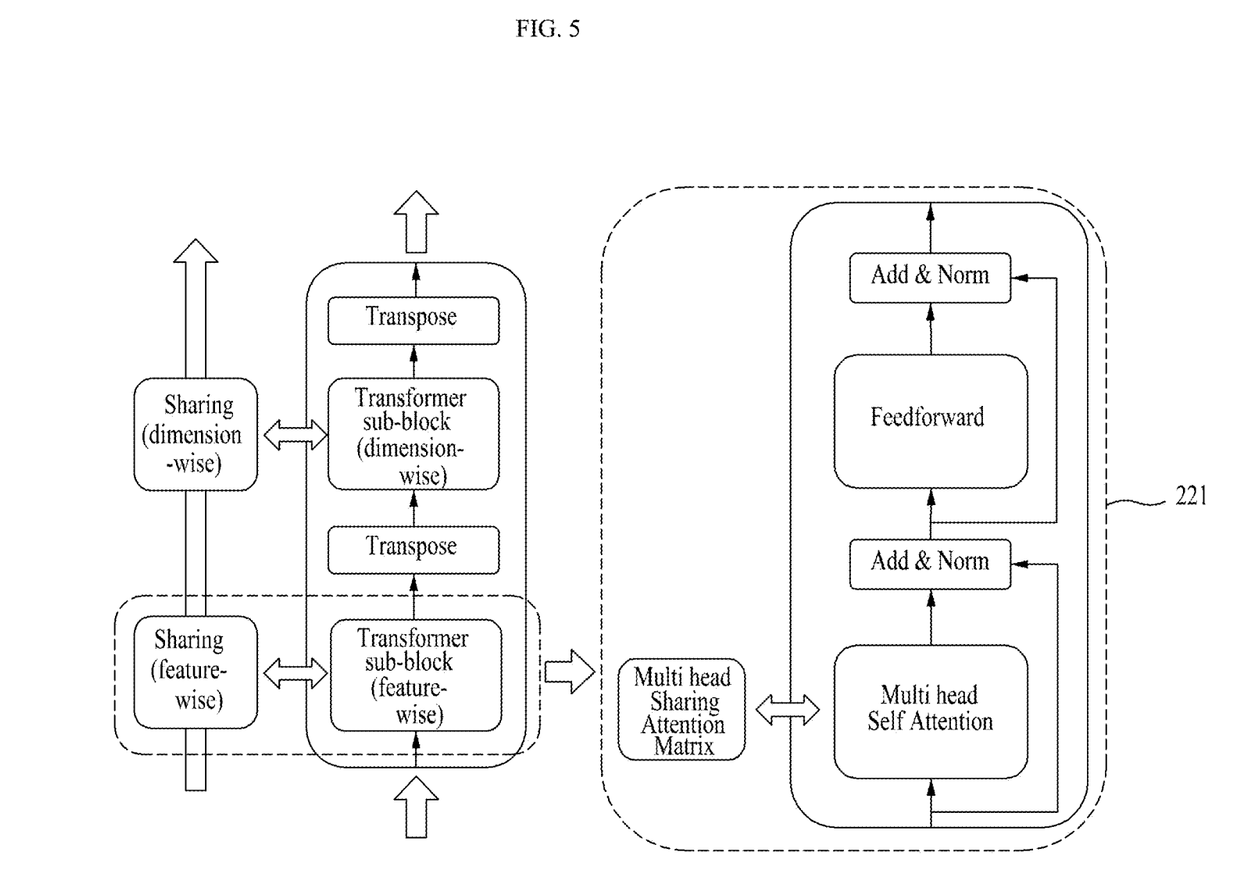
FIG. 5 illustrates the structure of a transformer block of the SALT model in an embodiment of the present disclosure.
Figure 6:
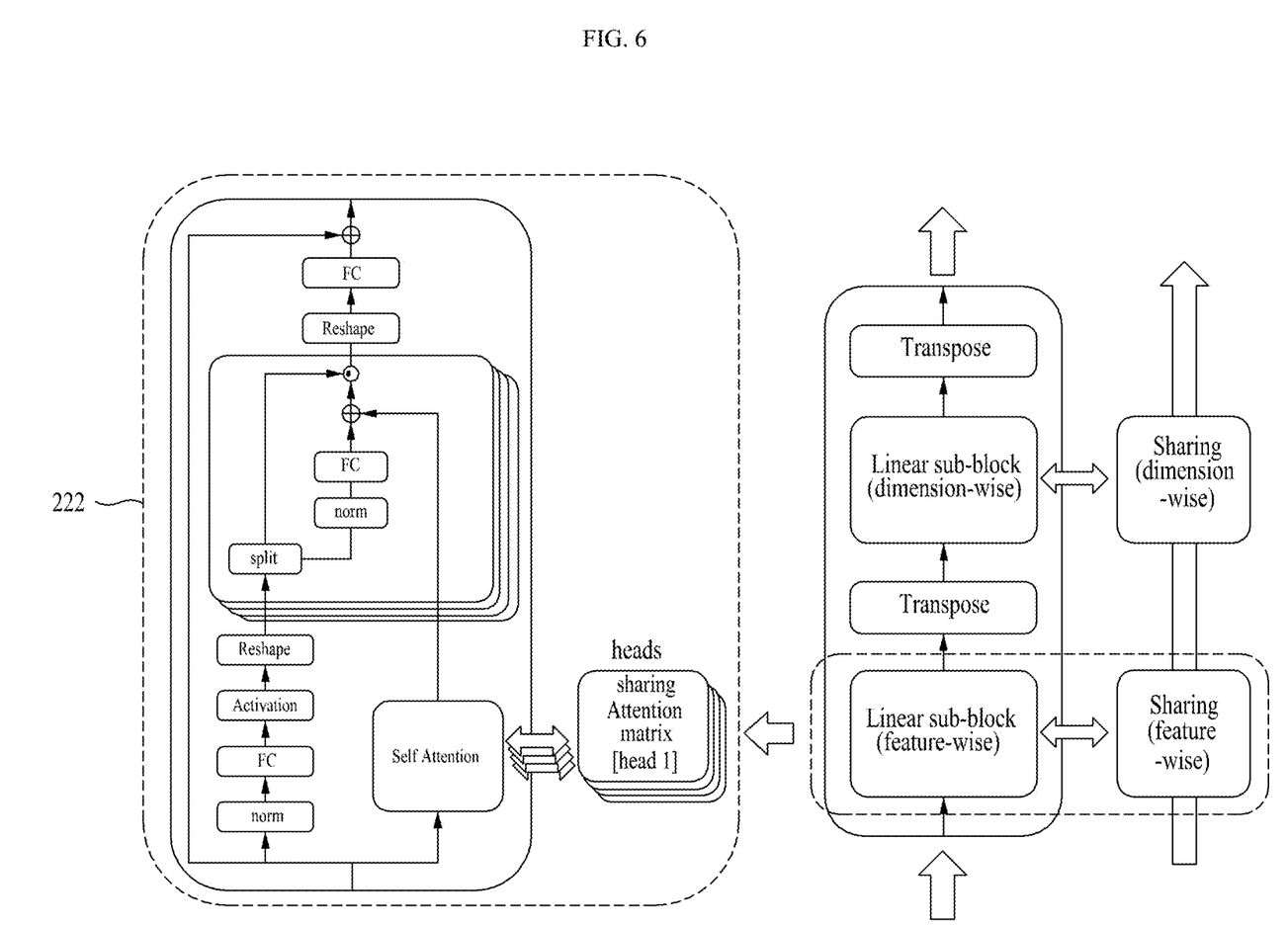
FIG. 6 illustrates the structure of a linear block of the SALT model in an embodiment of the present disclosure.

The transformer block 221 and the linear block 222 are described in detail as follows.

FIG. 5 illustrates the structure of the transformer block of the SALT model in an embodiment of the present disclosure. FIG. 6 illustrates the structure of the linear block of the SALT model in an embodiment of the present disclosure.

The learning layer 220 of the SALT model includes the transformer block 221 and the linear block 222. Each of the transformer block 221 and the linear block 222 has two sub-blocks. The sub-blocks are trained feature-wise and dimension-wise, respectively.

The transformer block 221, that is, one of the transformer block 221 and the linear block 222, follows the structure of an encoder of the existing transformer model. As illustrated in FIG. 5, the transformer block 221 includes a self-attention layer, a feed-forward layer, a residual connection of each layer, and layer normalization.

$$\text{attn}, a_{new} = \text{attention}(x, a) \; z = \text{LayerNorm}(\text{attn} + x) \quad (11)$$

$$ff = \text{FeedForward}(z) \; \tilde{z} = \text{LayerNorm}(ff + z) \quad (12)$$

wherein x is the input of the transformer block 221, and "a" is a sharing attention matrix of a previous stack. The sharing attention matrix that has been received from the previous stack is added to an attention matrix that is operated in the self-attention layer. The input of the block and the sharing attention matrix are used as the inputs of the self-attention layer. A z value is obtained through the residual connection and layer normalization for the inputs. The z value is used as the input of the feed-forward layer. The feed-forward layer, the residual connection, and the layer normalization are also performed. After all the processes are performed, the final result value $\tilde{z}$ is returned. Such a process is the same in the feature-wise sub-block and the dimension-wise sub-block.

The linear block 222 may be constituted with a model structure named gating multi-layer perceptron (gMLP). The gMLP model may show better performance than another model through MLP using a gating mechanism. The linear block 222 follows the structure of gMLP including the attention layer.

The linear block 222 of the SALT model according to an embodiment of the present disclosure has a difference from gMLP. Referring to FIG. 6, the gating unit of the linear block 222 has a multi-head structure. In this case, the sharing attention matrix is a multi-head attention matrix and is for using information of a matrix that has been learnt as an enriched expression through several heads.

$$\text{attn}, a_{new} = \text{attention}(x, a) \quad (13)$$

$$x_{norm} = \text{LayerNorm}(x) \quad (14)$$

$$\tilde{x} = f_1(x_{norm}) = \sigma(wx_{norm} + b) \quad (15)$$

$$\tilde{x} = \text{RESHAPE}(\tilde{x}, (n, (h \times d)) \to (h, n, d)) \quad (16)$$

$$z = g(\tilde{x}, \text{attn}) \quad (17)$$

$$z = \text{RESHAPE}(z, (h, n, d) \to (n, (h \times d))) \quad (18)$$

$$\tilde{z} = f_2(z) + x = (wz + b) + x \quad (19)$$

A learning process of the linear block 222 is as follows. First, as in Equation 13, an input value is transmitted to the attention layer. The attention layer returns an attention value attn $\in R^{h \times n \times d}$ and an attention matrix $a_{new}$ for sharing. The attention value "attn" is used the input of a gating unit g(z, attn) as in Equation 17.

Another layer to which the input value of the block is transmitted is the first linear layer of two linear layers and an activation function. The first linear layer converts an input value $x \in R_{n \times d}$ into $x \in R^{n \times (2 \times h \times d)}$ in order for an operation with the attention value in the multi-head structure and the gating unit as in Equation 15. A value $\tilde{x}$ that is obtained through the first linear layer is rearranged as a multi-head structure $x \in R^{h \times n \times (2 \times d)}$ as in Equation 16. In this case, h denotes the number of heads. $\tilde{x}$ is transmitted to the gating unit along with the attention value "attn" that has been obtained through Equation 13.

$$u, v = \text{split}(\tilde{x}) \quad (20)$$

$$v_{out} = W_v \cdot \text{LayerNorm}(v) \quad (21)$$

$$z = (v_{out} + \text{attn}) \odot u \quad (22)$$

A process of the gating unit is as follows. An input value $x \in R^{h \times n \times (2 \times d)}$ of the gating unit is divided into two parts $u \in R^{h \times n \times d}$ and $v \in R^{h \times n \times d}$. v becomes $v_{out}$ after experiencing layer normalization and a head-wise weight $w_v$, and $v_{out}$ is added to the attention value "attn" and is returned as a value of "z" through a product operation with "u".

"z" that is obtained through the gating unit is rearranged from a form of a multi-head to an original single form as in Equation 18. The rearranged z is converted into the original dimension through the last linear layer. The final result value $\tilde{z}$ of the linear block is returned through a residual connection. This process is identically applied to the feature-wise sub-block and the dimension-wise sub-block.

The sharing of a sharing attention matrix in the self-attention layer of each block and an attention matrix calculated in a current layer are described.

For example, an operation of the sharing attention matrix in the attention layer and the current attention matrix follows the structure of a RealFormer model. RealFormer is a model to which a residual connection structure has been applied, and is a model using the attention matrix of a previous block as a residual. The SALT model according to an embodiment of the present disclosure uses the role of a residual connection as a sharing role.

$$\text{Attention } (Q, K, V, \tilde{a}) = \text{softmax}\left(\frac{QK^T}{\sqrt{d_k}} + \tilde{a}\right) V \quad (23)$$

$$a_{new} = \left(\frac{QK^T}{\sqrt{d_k}} + \tilde{a}\right) \quad (24)$$

An attention matrix that is calculated in the self-attention layer of each block is $$\frac{QK^T}{\sqrt{d_k}}.$$

In this case, unlike in the self-attention layer of the transformer block 221, the attention matrix that is calculated in the self-attention layer of the linear block 222 is a single head attention matrix (n×n). Accordingly, for an operation with the sharing attention matrix, the single head attention matrix is repeated by the number of heads h of the sharing attention matrix and returned as a multi-head structure (h×n×n).

The attention matrix that is calculated in the attention layer is added to $$\left(\frac{QK^T}{\sqrt{d_k}} + \tilde{a}\right)$$

because the attention matrix has a structure having the same size as the sharing attention matrix $\tilde{a}$, and is transmitted to a next block. Furthermore, $$\left(\frac{QK^T}{\sqrt{d_k}} + \tilde{a}\right)$$

is subjected to the remaining self-attention operation as in Equation 23, and is returned as an attention value.

Figure 7:
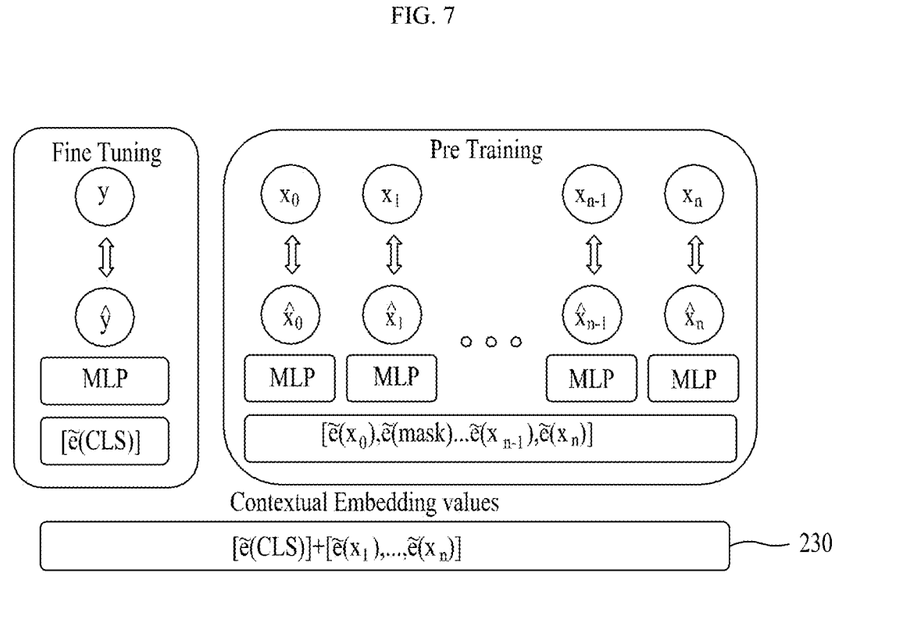
FIG. 7 illustrates an operation of a prediction layer of the SALT model in an embodiment of the present disclosure.

Referring to FIG. 7, the prediction layer 230 of the SALT model performs fine tuning (e.g., regression and a classification task) and pre-training by using a contextual embedding value that is obtained through all the stacks of the learning layer 220.

Figure 8:
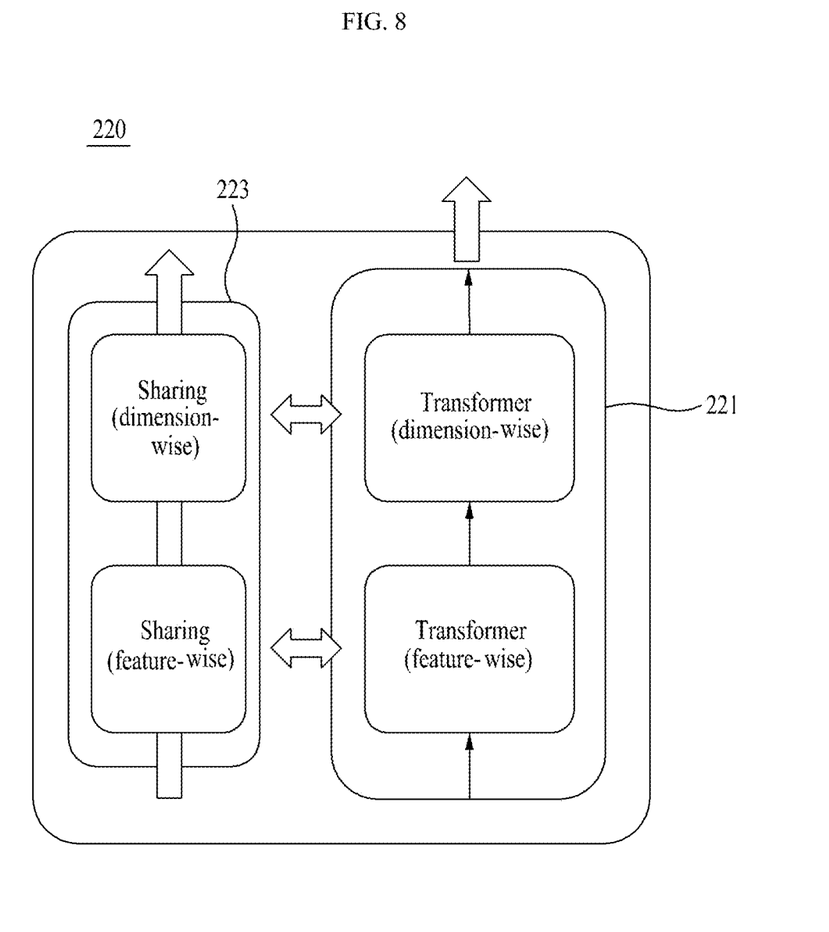
FIGS. 8 to 10 illustrate examples of modification structures of the SALT model in embodiments of the present disclosure.
Figure 9:
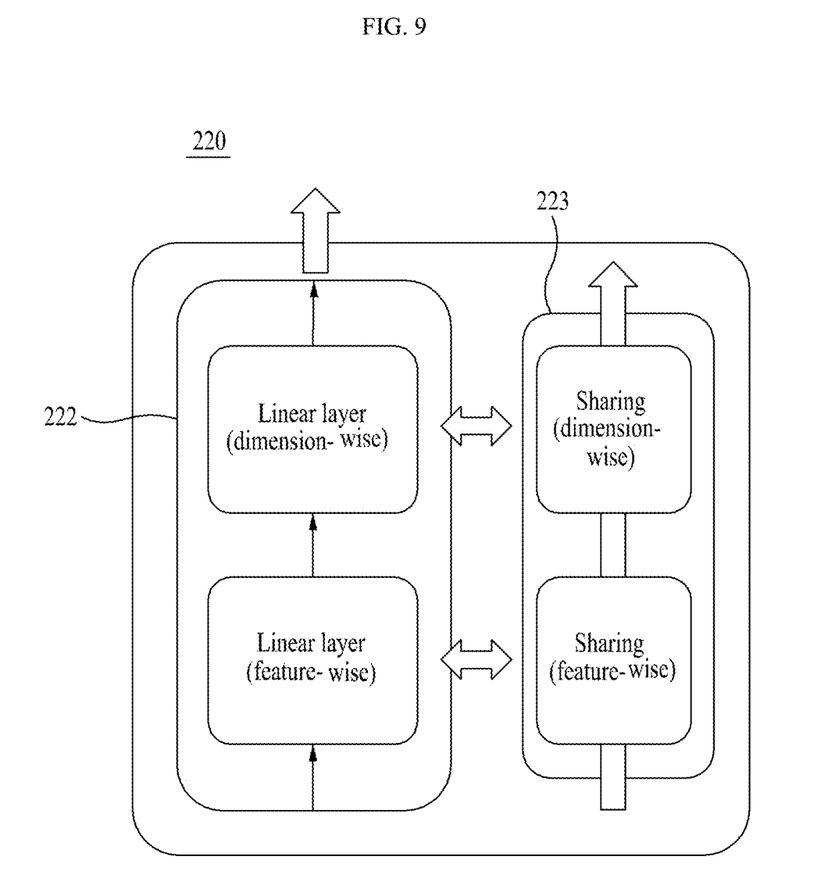
Figure 10:
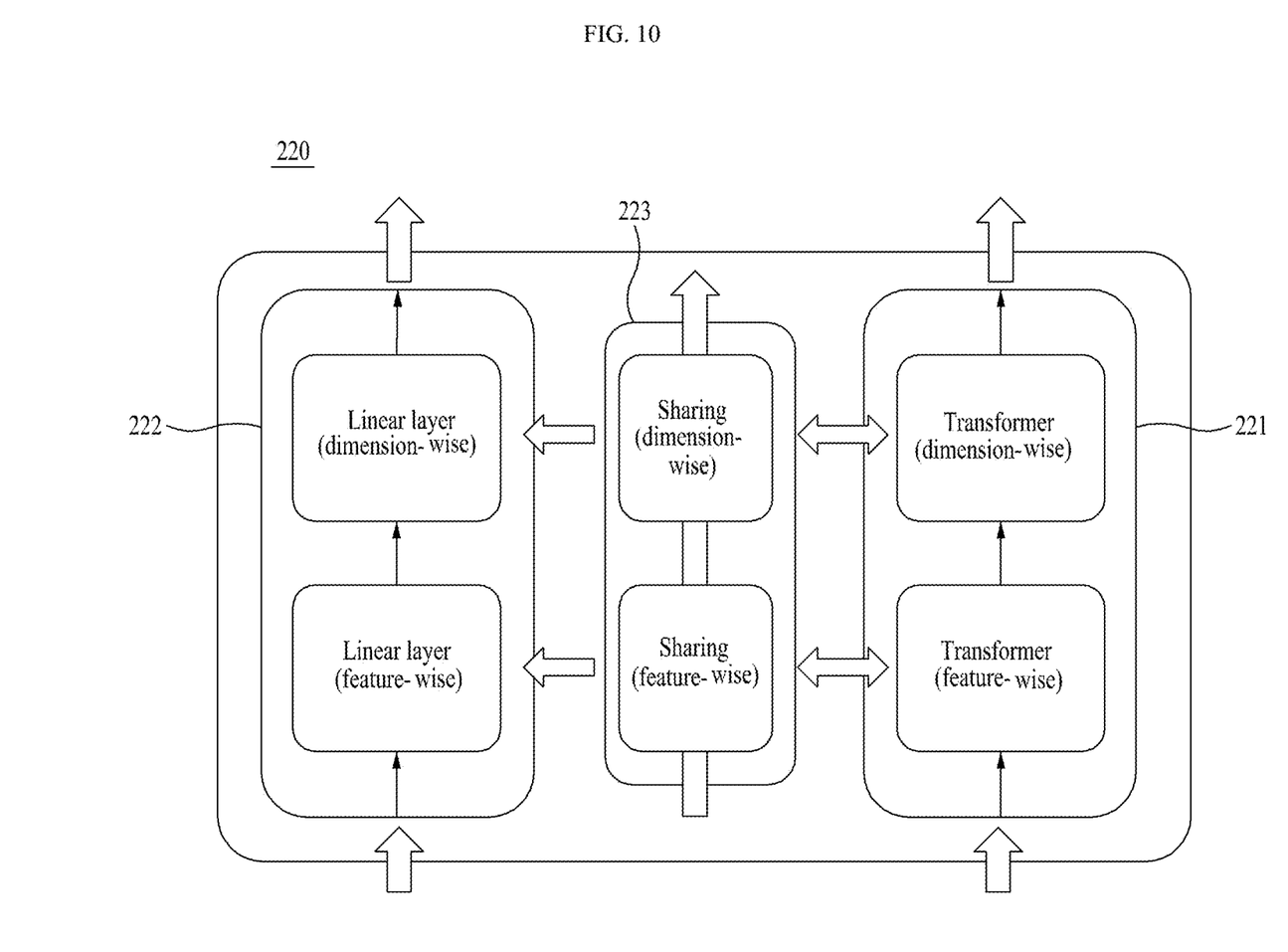

In addition to the structure of the SALT model, various modification structures may be applied. For example, referring to FIG. 8, the learning layer 220 may be constituted with the transformer block 221 and the sharing function 223. Furthermore, for example, referring to FIG. 9, the learning layer 220 may be constituted with the linear block 222 and the sharing function 223. Furthermore, for example, referring to FIG. 10, similarly to the structure of FIG. 2, the learning layer 220 may be constituted with the transformer block 221, the linear block 222, and the sharing function 223, but may have a structure in which attention is shared in one direction not both directions, for example, only from the transformer block 221 to the linear block 222.

As described above, according to embodiments of the present disclosure, performance higher than that of a machine learning algorithm, which is most used in the learning of tabular data, that is, structured data including categorical variables and continuous variables, can be achieved.

According to embodiments of the present disclosure, a deep learning model can be applied to all data through the embedding of continuous variables in addition to categorical variables.

According to embodiments of the present disclosure, a contextual embedding value can be obtained through the learning of embedding value for tabular data. An influence between data based on an attention value may be checked and interpreted through the self-attention module.

According to embodiments of the present disclosure, since the deep learning model based on attention is constructed with respect to tabular data, continuous learning is possible although new data is added, and good performance can be implemented through a pre-training scheme of semi-supervised learning even in a small data environment.

As described above, according to embodiments of the present disclosure, uppermost limits of a machine learning algorithm can be overcome and performance higher than that of machine learning in tabular data can be implemented because the deep learning model based on attention, including the embedding layer that embeds continuous variables of the tabular data in addition to categorical variables of the tabular data, the transformer block having the attention module, and the linear block, is constructed. Furthermore, the transformer block, that is, a basis for many models, can be used through the embedding of continuous variables. Accordingly, a contextual embedding value can be obtained, and information which may be interpreted through an attention matrix can be provided. Furthermore, higher performance can be implemented by constructing the deep learning model based on attention in which the attention matrix is shared between the linear block and the transformer block.

The aforementioned device may be implemented as a hardware component, a software component, or a combination of a hardware component and a software component. For example, the device and component described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction.

The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, a component, a physical device, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means, and may be stored in a computer-readable medium. In this case, the medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and a flash memory. Furthermore, other examples of the medium may include an app store in which apps are distributed, a site in which other various pieces of software are supplied or distributed, and recording media and/or storage media managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the disclosure in which an exclusive property or privilege is claimed are defined as follows:

1. A method of constructing a deep learning model based on attention, the method being performed in a computer device and comprising:
   converting, by at least one processor included in the computer device, tabular data of structured data having a mixture of categorical variables and continuous variables into embedding values; and
   training, by the at least one processor, a network model comprising a transformer block, a linear layer block, and a sharing function for sharing of an attention between the transformer block and the linear layer block by using the embedding values, wherein each of the transformer block and the linear layer block comprises a feature-wise sub-block and a dimension-wise sub-block; and wherein training the network model comprises:

returning a result value of the transformer block, a result value of the linear layer block, an attention matrix calculated in a feature-wise sub-block and dimension-wise sub-block of the transformer block, and an attention matrix calculated in a feature-wise sub-block and dimension-wise sub-block of the linear layer block;

converting, into a feature-wise sharing attention matrix of one matrix, the attention matrices calculated in the feature-wise sub-blocks of the transformer block and the linear layer block through the sharing function and converting, into a dimension-wise sharing attention matrix of one matrix, the attention matrices calculated in the dimension-wise sub-blocks of the transformer block and the linear layer block; and transmitting the feature-wise sharing attention matrix and the dimension-wise sharing attention matrix to a next stack, wherein the feature-wise sharing attention matrix and the dimension-wise sharing attention matrix that are received from a previous stack are added to attention matrices that are operated in self-attention layers of the transformer block and the linear layer block.

2. The method of claim 1, wherein converting the tabular data comprises:

converting the categorical variables into the embedding values by using index information of an embedding matrix, and converting the continuous variables into the embedding values through a matrix product of a softmax and an embedding matrix by projecting the continuous variables by a size of the embedding matrix through a linear layer.

3. The method of claim 1, wherein converting the tabular data comprises converting, into the embedding values, learning data obtained by adding a token value to the tabular data.

4. The method of claim 1, wherein each of the transformer block and the linear layer block comprises at least two sub-blocks on the basis of a direction in which data is learnt.

5. The method of claim 1, wherein the transformer block comprises a self-attention layer, a feed-forward layer, a residual connection of each layer, and layer normalization.

6. The method of claim 1, wherein a gating unit of the linear layer block has a multi-head structure based on a multi-layer perceptron (MLP) model structure.

7. The method of claim 1, wherein training the network model comprises:

converting an attention matrix in an identical direction between the transformer block and the linear layer block into a sharing attention matrix of one matrix through the sharing function, and transmitting the sharing attention matrix to the next stack.

8. The method of claim 1, further comprising performing, by the at least one processor, at least one of fine tuning and pre-training on the tabular data by using a contextual embedding value that is obtained through the network model.

9. A system for constructing a deep learning model based on attention, the system being implemented as a computer and comprising:

at least one processor configured to execute computer-readable instructions included in a memory, wherein the at least one processor is configured to:

convert tabular data of structured data having a mixture of categorical variables and continuous variables into embedding values, and train a network model comprising a transformer block, a linear layer block, and a sharing function for sharing of an attention between the transformer block and the linear layer block by using the embedding values, wherein each of the transformer block and the linear layer block comprises a feature-wise sub-block and a dimension-wise sub-block;

wherein the at least one processor is configured to:

return a result value of the transformer block, a result value of the linear layer block, an attention matrix calculated in a feature-wise sub-block and dimension-wise sub-block of the transformer block, and an attention matrix calculated in a feature-wise sub-block and dimension-wise sub-block of the linear layer block;

convert, into a feature-wise sharing attention matrix of one matrix, the attention matrices calculated in the feature-wise sub-blocks of the transformer block and the linear layer block through the sharing function and converting, into a dimension-wise sharing attention matrix of one matrix, the attention matrices calculated in the dimension-wise sub-blocks of the transformer block and the linear layer block; and transmit the feature-wise sharing attention matrix and the dimension-wise sharing attention matrix to a next stack, wherein the feature-wise sharing attention matrix and the dimension-wise sharing attention matrix that are received from a previous stack are added to attention matrices that are operated in self-attention layers of the transformer block and the linear layer block.

10. The system of claim 9, wherein the at least one processor is configured to:

convert the categorical variables into the embedding values by using index information of an embedding matrix, and convert the continuous variables into the embedding values through a matrix product of a softmax and an embedding matrix by projecting the continuous variables by a size of the embedding matrix through a linear layer.

11. The system of claim 9, wherein the at least one processor is configured to convert, into the embedding values, learning data obtained by adding a token value to the tabular data.

12. The system of claim 9, wherein each of the transformer block and the linear layer block comprises at least two sub-blocks on the basis of a direction in which data is learnt.

13. The system of claim 9, wherein the transformer block comprises a self-attention layer, a feed-forward layer, a residual connection of each layer, and layer normalization.

14. The system of claim 9, wherein a gating unit of the linear layer block has a multi-head structure based on a multi-layer perceptron (MLP) model structure.

15. The system of claim 9, wherein the at least one processor is configured to:

convert an attention matrix in an identical direction between the transformer block and the linear layer block into a sharing attention matrix of one matrix through the sharing function, and transmit the sharing attention matrix to the next stack.

16. A non-transitory computer program which is stored in a computer-readable recording medium in order to execute a method of constructing a deep learning model based on attention in a computer, the method comprising:
- converting tabular data of structured data having a mixture of categorical variables and continuous variables into embedding values, and
- training a network model comprising a transformer block, a linear layer block, and a sharing function for sharing of an attention between the transformer block and the linear layer block by using the embedding values, wherein each of the transformer block and the linear layer block comprises a feature-wise sub-block and a dimension-wise sub-block; and wherein training the network model comprises:
- returning a result value of the transformer block, a result value of the linear layer block, an attention matrix calculated in a feature-wise sub-block and dimension-wise sub-block of the transformer block, and an attention matrix calculated in a feature-wise sub-block and dimension-wise sub-block of the linear layer block;
- converting, into a feature-wise sharing attention matrix of one matrix, the attention matrices calculated in the feature-wise sub-blocks of the transformer block and the linear layer block through the sharing function and converting, into a dimension-wise sharing attention matrix of one matrix, the attention matrices calculated in the dimension-wise sub-blocks of the transformer block and the linear layer block; and
- transmitting the feature-wise sharing attention matrix and the dimension-wise sharing attention matrix to a next stack, wherein the feature-wise sharing attention matrix and the dimension-wise sharing attention matrix that are received from a previous stack are added to attention matrices that are operated in self-attention layers of the transformer block and the linear layer block.

* * * * *